US007884290B2

(12) United States Patent
Lyon

(10) Patent No.: US 7,884,290 B2
(45) Date of Patent: Feb. 8, 2011

(54) SANITARY, LIVE LOADED, PASS THROUGH FITTING APPARATUS

(76) Inventor: Daniel Lyon, 912 N. Salem Rd., Ridgefield, CT (US) 06877

(*) Notice: Subject to any disclaimer, the term of this patent is extended or adjusted under 35 U.S.C. 154(b) by 0 days.

(21) Appl. No.: 12/414,734

(22) Filed: Mar. 31, 2009

(65) Prior Publication Data

US 2009/0200745 A1 Aug. 13, 2009

Related U.S. Application Data

(63) Continuation-in-part of application No. 11/500,693, filed on Aug. 9, 2006, now abandoned.

(51) Int. Cl.
*H02G 3/18* (2006.01)

(52) U.S. Cl. ....................................... 174/653; 439/462

(58) Field of Classification Search ................. 439/197, 439/578, 320, 322, 323; 174/77 R, 153 G, 174/152 R, 652, 653

See application file for complete search history.

(56) References Cited

U.S. PATENT DOCUMENTS 2,131,066 A * 9/1938 Obermaier .................. 439/275
2,361,215 A * 10/1944 Lamberger et al. ...... 174/152 R
2,619,515 A * 11/1952 Doane ........................ 439/274
3,739,076 A * 6/1973 Schwartz ..................... 174/78
3,757,274 A * 9/1973 Hazelhurst .................. 439/281
3,904,812 A * 9/1975 Daffron ...................... 174/549
3,963,297 A * 6/1976 Panek et al. ................ 439/204
4,137,768 A 2/1979 Tushie
5,600,094 A * 2/1997 McCabe ..................... 174/653
5,632,557 A 5/1997 Simons

* cited by examiner

*Primary Examiner*—Neil Abrams
*Assistant Examiner*—Harshad C Patel
(74) *Attorney, Agent, or Firm*—Ingenium Patents LLC; Peter R. Kramer

(57) ABSTRACT

A sanitary, live loaded, pass-through fitting apparatus which allows for variable depth insertion of a pass-through object is disclosed. The apparatus is useful for sanitary introduction of a thermowell probe, dip tube, or other objects into a process stream or vessel. The pass-through object is sealed to the fitting at the point of fluid insertion with the seal material under a live load.

18 Claims, 3 Drawing Sheets

SANITARY, LIVE LOADED, PASS THROUGH FITTING APPARATUS

CROSS-REFERENCE TO RELATED APPLICATIONS

This application is a Continuation-In-Part of U.S. Nonprovisional application Ser. No. 11/500,693 filed Aug. 9, 2006 which claims priority benefit of U.S. Provisional Application Ser. No. 60/709,061 filed Aug. 17, 2005. The contents of U.S. Ser. No. 60/709,061 and U.S. Ser. No. 11/500,693 are expressly incorporated herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to apparatus and methods to monitor process conditions in a container or chamber or process stream including bioreactors for cell cultures and microbial fermentation, semiconductor fabrication, or any process where microbial contamination or chemical cross contamination is undesirable.

2. Description of Related Art

In the related art, thermowells or cylindrical tubes, have been employed to hold sensors used to monitor conditions of process fluids. Typically compression fittings such as in FIG. 2 are used in combination with thermowells and the like which feature seals located within the interior portion of the fitting, i.e., these fittings seal to the probe or tube away from the process stream but allow for variable insertion depth. An example which describes a variable depth thermowell assembly employing compression fittings is U.S. Pat. No. 4,137,768. A disadvantage of compression seal-based designs (FIG. 2) is that because the seals 1 are positioned away from the insertion point to the process stream, process fluid can become entrapped in a retention zone 2 in the interior portion of the fitting permitting bacterial growth or chemical contamination. In many applications such as biopharmaceutical processes, bacterial or chemical contamination may render the process fluid unacceptable for use. For this reason, compression-type fittings must be disassembled, cleaned, and thoroughly drained before reuse—a time consuming and therefore costly disadvantage. An example of a typical pass-through fitting utilizing compression fittings is depicted in FIG. 2. As an alternative to adjustable depth designs, thermowells or dip tubes can be welded and sealed in place to a sanitary fitting at a predetermined length for the insertion depth. This design which avoids the disadvantages of fluid entrapment that occurs with designs employing compression fittings does not allow for variable insertion depth of a probe or tube once it has been manufactured. An example of a typical welded and sealed design is shown in FIG. 1.

BRIEF SUMMARY OF THE INVENTION

The invention relates to a sanitary pass-through fitting apparatus. The apparatus permits variable depth insertion of a cylindrical pass through object such as thermowell or dip tube into a process stream featuring sealing at the point of insertion and therefore confines process fluid to the process side of the apparatus without entrapment areas or cavities that may entrap process fluid and lead to bacterial growth or cross-contamination.

BRIEF DESCRIPTION OF THE SEVERAL VIEWS OF THE DRAWING(S).

DETAILED DESCRIPTION OF THE INVENTION

Figure 1:
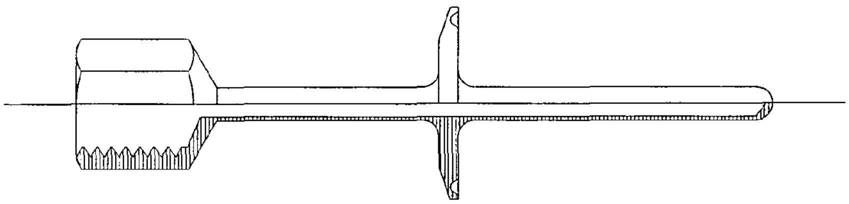
Figure 1 Prior Art
FIG. 1 Is a side view and partial sectional view of a typical thermowell example from the related art.
Figure 2:
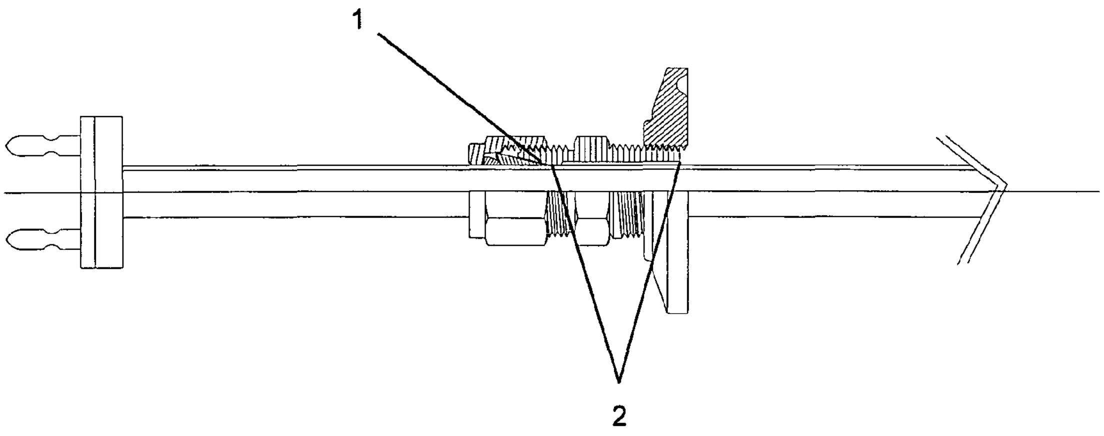
Figure 2 Prior Art
FIG. 2 Is a side view and partial sectional view of a typical industrial thermocouple threaded into sanitary cap.
Figure 3:
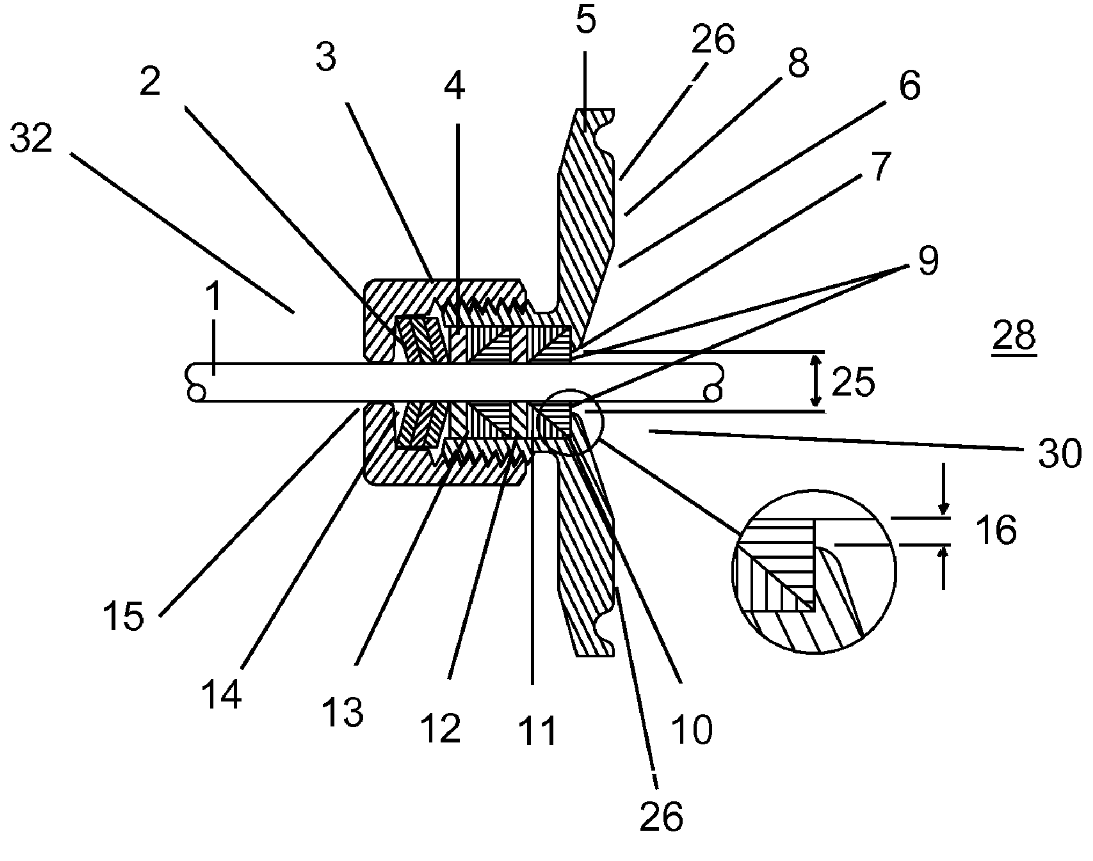
FIG. 3 Is a sectional view from the side of an embodiment of the sanitary, live loaded pass through apparatus with cylindrical object in place to illustrate the internal construction.

An embodiment of a fitting apparatus 28 is shown in FIG. 3. The apparatus essentially has radial symmetry and therefore two ends, a process end 30 and a non-process end 32. The apparatus has a fitting body 5, having an upper portion with external threads to accommodate a packing nut 3 with internal threads, and including a packing step 10, and having an end face 26 on the process side 8 with an inclusive angle 6, terminating at a radius 7. The term, “process side,” denotes that side of the fitting body wherein the end face faces process fluid. Thus the expression “the surface of the fitting body on the process side” denotes a surface of the end face of the fitting apparatus that contacts fluid. It should be understood that from the perspective as illustrated in FIG. 3 “upper” or “above” when applied to an internal component within the apparatus refers to the direction proximal to the packing nut and the terms “lower” or “below” analogously refer to the direction of the process fluid and that these terms are applied in this directional sense even if the device is positioned with horizontal or inverted orientation. An internal cavity 14 is formed when the packing nut and fitting body are engaged. A cylindrical device 1 is passed through the packing nut and fitting internals as shown. Internal components are arranged as shown in a cavity 14 formed within the packing nut and the fitting body, comprising spring washers 2, upper packing gland 4, upper sealing member 13, lower packing gland 12, and lower sealing member 11 such as but not limited to a chevron packing. The sealing members can be fabricated from polytetrafluoroethylene or other polymers. A lower sealing member 11 is positioned such that it abuts with and is retained by a packing step 10.

Upon tightening the packing nut 3, an axial load is translated to the spring washers 2, and to the packing glands 12, 4, and to the sealing members 13, 11. An axial seal is made by the lower sealing member 11 to the packing step 10 on the lower interior portion of the pass through fitting body. A radial seal 9 is created to the cylindrically shaped pass through object. Because the process side 8 of the pass through fitting body has an inclusive angle 6 terminating in a radius 7 as shown, with the radius being contiguous with the packing step, the lower sealing member is partially exposed and fluid cannot penetrate upward beyond the plane in which the radial seal lies, i.e., fluid cannot penetrate upward or in the direction of the packing nut beyond the insertion point. The term, radius, denotes the rounded terminus of the end face of the fitting body which forms the orifice (25) through which the cylindrical object passes. The term, inclusive angle, denotes a concave surface on the process side end face of the fitting body contiguous with the radius, such that the surface formed by the inclusive angle is nonparallel to the plane of the orifice (25). The insertion point is defined according to its plain meaning within the context of settings involving insertion of a probe protruding into a fluid-filled chamber or process stream—thermowell probes, pass through probes, and various process control probes. It is the point where the pass-through object enters the process stream or the chamber. The insertion point according to the embodiment shown in FIG. 3 is located at the point of seal formed between the pass-through object and the lower sealing member at the exposed surface of the lower sealing member. On the process side, only exposed surfaces contact the fluid and these can be easily rinsed, cleaned or drained because entrapment of fluid in the interior portion of the fitting is prevented. The gap (16) between the radius and pass-through object is of sufficient magnitude that fluid retention is prevented. There are no narrow cavities or crevices permitting infiltration of process fluid into the fitting. Contact between process fluid and apparatus is essentially limited to a continuous surface formed by the exterior portion of the cylindrical object 1, the partially exposed portion 9 of sealing member 11, the inclusive angle 6, and radius 7. Thus an impenetrable barrier is formed that is essentially or substantially surfacial.

By loosening and retightening the packing nut 3, the insertion depth of the cylindrical object 1 can be adjusted to an optimum sensing or sampling point. The spring washers 2 dynamically compensate for wear and thermal cycling of the packing components, aiding in leak tightness of the apparatus.

The upper sealing member 13 serves to grip and provide lateral support without damage to a cylindrically shaped pass through object.

The upper and lower packing glands 4, 12 serve to properly load and contain the upper and lower sealing members. Additional pairs of sealing members and packing glands may be employed.

Figure 4:
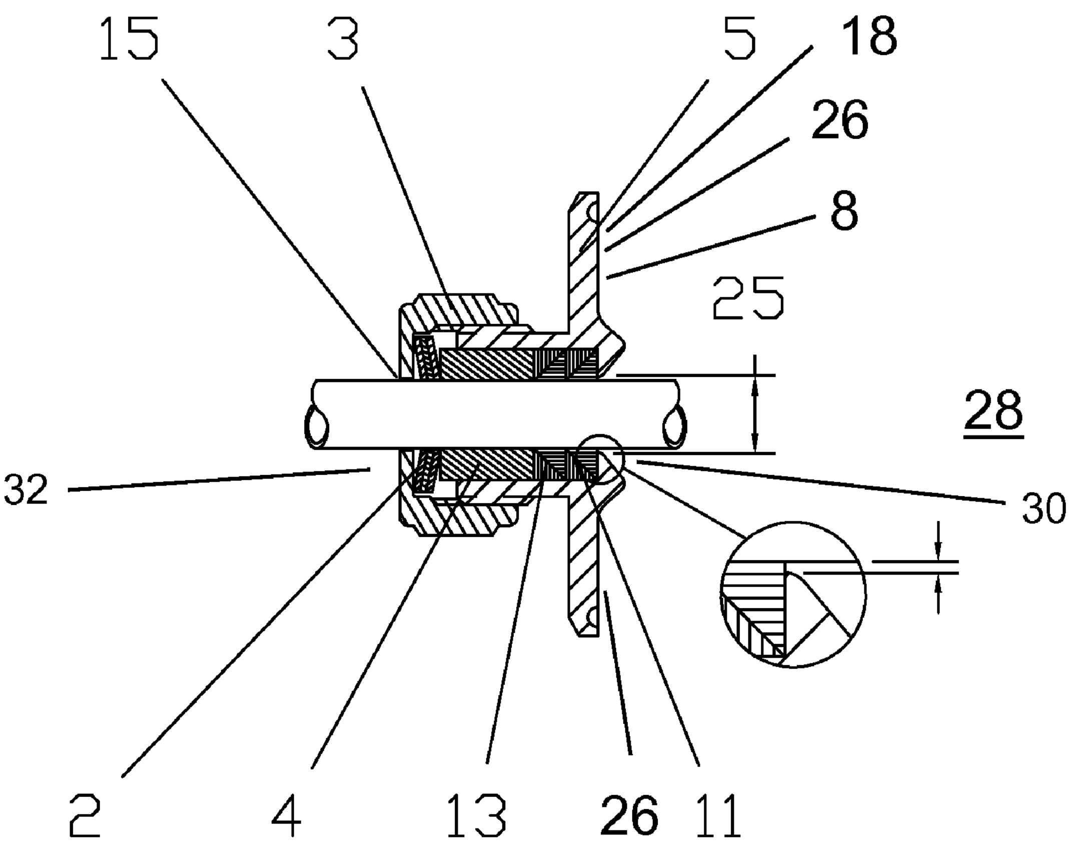
FIG. 4 Is a sectional view from the side of another embodiment of the sanitary, live loaded pass through apparatus with cylindrical object in place to illustrate the internal construction.

In another embodiment, FIG. 4, a single packing gland (4) is positioned adjacent to the spring washers (2), a Chevron packing (11) is positioned on the packing step (10) and a second Chevron packing (13) is positioned between packing (11) and packing gland (4). The exposed surface of the Chevron packing (11) is flush with the fitting body; i.e., the insertion point lies in the plane formed by the flat portion (18) of the process side of the fitting body. The diameter about the radius is greater than the diameter of the pass-through object so that the gap formed between the pass through object and radius can range from 0.0020-0.0050 inches. With radius diameter of 0.255 in, the optimal gap for high temperature operation is 0.0025 in. This embodiment is suitable for high temperature operation. The point of probe insertion is more accessible for clean in place and steam in place operation than the apparatus shown in FIG. 3.

SEQUENCE LISTING

Not Applicable

I claim:

1. An apparatus for introducing a pass-through object at variable depth into a process fluid in a process chamber or into a process fluid in a process stream, comprising, a fitting body (5), an end face of said apparatus located on said fitting body, said end face facing said proccss chamber or facing said process stream, a process side, said fitting body having said process side with said process side located on said end face, means for forming a seal between said means and said pass-through object at an insertion point, with the term, insertion point, defined as the point where said pass-through object enters said process stream or said process chamber wherein at least one seal point is formed at said insertion point whereby said process fluid is confined to said process chamber, and wherein said process chamber facing side of the fitting including an end face surface that tapers inwardly to form a substantially wedge-like flange leaving an opening at which a portion of the means for forming a seal is exposed to fluid within the confines of the process chamber or stream, and one or more spring members positioned in an internal cavity.

2. An apparatus according to claim 1 further comprising, a concave surface comprising an inclusive angle, a radius, with said inclusive angle terminating at said radius, and an orifice, with said inclusive angle terminating at said radius, with the surface of said radius forming said orifice on said process side of said fitting body and with said inclusive angle and said radius located on said process side.

3. An apparatus according to claim 2 further comprising, internal cavity, a packing step located on said fitting body within said internal cavity and adjacent to said radius.

4. An apparatus according to claim 1 further comprising, a concave surface comprising an inclusive angle on said end face, a radius, said inclusive angle terminating at said radius on said end face, and an orifice, with the surface of said radius forming said orifice on said end face.

5. A fitting apparatus for inserting a cylindrical pass-through object into a process fluid at variable insertion depth, with the process fluid contained in a process chamber, or for inserting a cylindrical pass-through object into a process fluid within a process fluid stream at variable insertion depth comprising, a fitting body, a process side, with said fitting body having said process side, an end face, said end face located on said process side of said fitting body a packing nut, said packing nut in engagement with said fitting body, an internal cavity formed by the inner surfaces of said packing nut and said fitting body, at least one spring washer within said internal cavity, a packing gland and a sealing member, said spring washer arranged with said packing gland positioned between said spring washer and said sealing member and further positioned such that said sealing member is closest to said end face, and a seal point between said cylindrical pass-through object and said sealing member wherein said seal point is at an insertion point, with the term, insertion point, defined as the point where the pass-through object enters said process fluid stream or said process chamber.

6. An apparatus according to claim 5 further comprising, a partially exposed surface wherein said sealing member has said partially exposed exterior surface, a concave surface comprising an inclusive angle on said-process side-of said fitting body, a radius, said inclusive angle terminating at said radius, the surface of said radius forming an orifice on said fitting body at said process side, said partially exposed surface being contiguous to said radius and arranged so that said partially exposed surface, said radius and said inclusive angle comprise a substantially continuous surface on said process side of said fitting body.

7. An apparatus according to claim 6 further comprising, a packing step wherein said fitting body has said packing step on said fitting body and within said internal cavity, said sealing member forming an axial seal to said packing step.

8. An apparatus according to claim 7 further comprising, two packing glands, and two sealing members, with said two packing glands and said two sealing members arranged with one sealing member closest to said end face, the sealing member closest to said end face is surmounted by one of said packing glands, the packing gland surmounting the sealing member closest to said end face is in turn surmounted by the second sealing member which is in turn surmounted by the second packing gland.

9. An apparatus according to claim 7 further comprising, a single packing gland, and two sealing members, with said single packing gland and said two sealing members arranged with one sealing member closest to said end face, with the sealing member closest to said end face in turn surmounted by the second sealing member, and with the second sealing member in turn surmounted by said single packing gland.

10. An apparatus according to claim 9 further comprising, a gap between said orifice and said cylindrical pass-through object, the magnitude of said gap being 0.0025 inches with machine tolerance −0.005 +0.0025.

11. An apparatus according to claim 9 further comprising, a flat portion on said process side of said fitting body, and a configuration such that said seal point formed at said insertion point lies within the plane formed by said flat portion.

12. An apparatus according to claim 1 further comprising, a flat portion on said process side of said fitting body, and a configuration such that said seal point formed at said insertion point lies within the plane formed by said flat portion.

13. A method for adjusting the depth of a pass-through object in process fluid or a body of fluid using a pass-through fitting apparatus, with the pass-through object placed into a process chamber or into a process stream comprising, passing a pass through object through a bore hole in a packing nut, engaging said packing nut with a fitting body, with said pass-through fitting apparatus having an end face, and with said fitting body having a process side, wherein said process side is located on said end face, forming an internal cavity, applying axial force with said packing nut, translating said axial force with a spring means located within said internal cavity, and forming a seal point with a sealing means said seal point located at an insertion point, with the term, insertion point, defined as the point where said pass-through object enters said process stream or said process chamber, whereby said sealing means is urged by said translated axial force thereby forming said seal point and thereby causing said process fluid to be confined to said process side of end face, and wherein said process chamber facing side of the fitting including an end face surface that tapers inwardly to form a substantially wedge-like flange leaving an opening at which a portion of the means for forming a seal is exposed to fluid within the confines of the process chamber or stream, and one or more spring members positioned in an internal cavity.

14. A method according to claim 13 further comprising, arranging said sealing means such that it has a partially exposed surface, and said partially exposed surface comprising a portion of said end face.

15. A method according to claim 13 further comprising, arranging said end face such that it has a concave surface comprising an inclusive angle, and a radius on said end face, said inclusive angle terminating at said radius, the surface of said radius forming an orifice in said end face.

16. A method according to claim 15 further comprising, positioning a packing gland within said internal cavity and adjacent to said sealing means wherein said packing gland is proximal to said packing nut.

17. A method according to claim 16 further comprising, two packing glands, two sealing means, and arranging said two packing gland and said two sealing means with one sealing means closest to said end face, with said closest sealing means in turn surmounted by, one of said packing glands, in turn surmounted by the second sealing means, which is in turn surmounted by the second packing gland.

18. A method according to claim 16 further comprising, a single packing gland, two sealing means, and arranging said packing gland and sealing means in a stacked configuration with said packing gland oriented toward the packing nut and said sealing means oriented toward the process side of said fitting body.

* * * * *